United States Patent
Desandoli et al.

(10) Patent No.: US 7,200,170 B1
(45) Date of Patent: Apr. 3, 2007

(54) HIGH SPEED I-O LOOPBACK TESTING WITH LOW SPEED DC TEST CAPABILITY

(75) Inventors: Lisa Ann Desandoli, Coquitlam (CA); Jurgen Hissen, Port Moody (CA); Kenneth William Ferguson, Burnaby (CA); Gershom Birk, Coquitlam (CA)

(73) Assignee: PMC-Sierra, Inc., Santa Clara, CA (US)

( * ) Notice: Subject to any disclaimer, the term of this patent is extended or adjusted under 35 U.S.C. 154(b) by 714 days.

(21) Appl. No.: 10/193,131

(22) Filed: Jul. 12, 2002

(51) Int. Cl.
*H04B 3/46* (2006.01)

(52) U.S. Cl. .................. 375/224; 370/241; 370/249

(58) Field of Classification Search ............... 375/224; 370/249, 241
See application file for complete search history.

(56) References Cited

U.S. PATENT DOCUMENTS

| | | | |
|---|---|---|---|
| 3,959,598 A * | 5/1976 | Asmussen et al. ........... | 379/183 |
| 4,271,513 A | 6/1981 | Maejima et al. | |
| 4,743,857 A * | 5/1988 | Childers ..................... | 331/1 A |
| 5,479,098 A * | 12/1995 | Yokoyama et al. .......... | 324/212 |
| 5,787,114 A | 7/1998 | Ramamurthy et al. | |
| 5,953,372 A | 9/1999 | Virzi | |

OTHER PUBLICATIONS

Howard Johnson and Martin Graham, "High Speed Digital Design: A Handbook of Black Magic," Prentice Hall, Inc. Upper Saddle River, NJ, pp. 236, 1993.

* cited by examiner

*Primary Examiner*—Temesghen Ghebretinsae
(74) *Attorney, Agent, or Firm*—Oyen Wiggs Green & Mutala LLP

(57) ABSTRACT

A loopback circuit for testing low and high frequency operation of integrated circuit transmitter and receiver components. First and second resistors forming a first branch of the circuit are series-connected between first and second circuit ports. Third and fourth resistors forming a second branch of the circuit are series-connected between third and fourth circuit ports. A DC isolator is connected between the first and second branches. At lower frequencies, the two branches are DC-isolated, enabling ATE-measurement of the transmitter's output drive level independently of the receiver, continuity testing of ESD protection structures, etc. At higher frequencies, the transmitter's output signal is split into three portions, each of which is attenuated by a selected amount. One of the attenuated signal portions is applied to the receiver to test the receiver's sensitivity, independently of possible excess resiliency in the transmitter's output drive level.

26 Claims, 7 Drawing Sheets

HIGH SPEED I-O LOOPBACK TESTING WITH LOW SPEED DC TEST CAPABILITY

TECHNICAL FIELD

This invention provides a loopback circuit which permits both low speed DC test access and high speed built-in self-test access to the high speed receiver and transmitter pins of an integrated circuit device.

BACKGROUND

Modern high speed integrated circuit devices incorporate many high speed receiver (i.e. input), transmitter (i.e. output) and bi-directional (i.e. input and/or output) components. These components, which are also called "input-output", or simply "I-O" components, receive and transmit data at very high bit rates. For example, multiplexers, cross-connects, routers and switches are commonly constructed using integrated circuits incorporating I-O components capable of operating at serial interface speeds of 622.08 Mbit/s or higher. A single integrated circuit device may incorporate hundreds of high speed I-O components. Each high speed I-O component is electrically coupled to a corresponding one of the integrated circuit's I-O pins.

Before a newly fabricated integrated circuit device is shipped to the customer, the device must be tested to verify, that it operates correctly in accordance with the manufacturer's specifications. Many tests are commonly performed. Some tests can be performed at relatively low speeds with the aid of automated test equipment (ATE). For example, a basic continuity test is initially performed to verify that the electrostatic discharge (ESD) diodes coupled to each one of the integrated circuit's I-O pins are present and functioning properly. ESD diode testing requires direct current (DC) access to the integrated circuit's I-O pins. Another example, well known to persons skilled in the art, is so-called JTAG boundary scan testing, which is typically performed at low speeds on the order of about 5 MHz.

Some tests must be performed at the full rated speed of the device in order to verify that the device operates correctly in accordance with the manufacturer's speed specifications for the device. Such "at-speed" testing can exceed the capabilities of all but the most expensive ATE, making at-speed testing with ATE prohibitively expensive. Even if ATE suitable for at-speed testing is available, the ATE must be configured for at-speed testing in a manner which inhibits the ability of the ATE to perform DC or low speed tests without time-consuming reconfiguration of the ATE. At-speed tests can be performed, without ATE, with the aid of alternate data source and capture (observation) equipment. However, such equipment is expensive and, in any event, is limited to use with only a few of the potentially hundreds of I-O pins coupled to the corresponding high speed I-O components which must undergo at-speed testing.

Built-in self-testing (BIST) enables high speed testing of an integrated circuit device with minimal ATE hardware and functionality requirements. In effect, BIST uses the integrated circuit device to test itself. This is accomplished by designing into and fabricating with the device, test circuitry which is specifically adapted for use in post-fabrication testing the device.

Loopback testing is a common BIST at-speed test technique in which a high speed signal output by one of an integrated circuit device's transmitter components is input ("looped back") to one of the device's receiver components. The device's low speed ports are used to enable and poll the device's BIST functional elements to execute various BIST tests. By executing and observing a loopback BIST test, one may verify that the transmitter and receiver components operate correctly in accordance with the manufacturer's speed specifications for the device.

A major drawback of loopback testing is that an I-O pin which is connected to specialized loopback test circuitry for at-speed testing cannot be simultaneously connected to ATE for DC or low speed testing. Loopback test circuitry must be impedance-matched to the integrated circuit device component being tested. Simultaneous connection of ATE to the device component being tested introduces an impedance mis-match resulting in unwanted signal reflections which interfere with at-speed testing. The prior art has addressed this problem by using relay banks to switch between loopback test circuitry and ATE at each I-O pin. However, relay bank configuration is time consuming and cumbersome due to the large number (potentially hundreds) of high speed I-O pins involved and due to relays' relatively high failure rates.

Another drawback of loopback testing is that an independent pass/fail test result is not necessarily produced for each I-O pin. For example, an unusually resilient transmitter (driver) may offset a defective (insufficiently sensitive) receiver, producing an incorrect test pass result. Conversely, an overly sensitive receiver may offset a defective (insufficiently powerful) transmitter, producing another incorrect test pass result. Transmitter-receiver interdependency errors of this sort can be avoided by using the ATE to measure the transmitter's output drive level independently of the receiver to confirm that the transmitter's output drive level is within acceptable limits. The transmitter's output signal is subsequently adjusted such that the drive amplitude applied to the receiver is sufficiently small to test the receiver's sensitivity independently of any transmitter drive fluctuations (assuming the transmitter's output drive level is found to be within acceptable limits.). However, BIST techniques facilitate control of the transmitter's output drive level only within a limited range, necessitating provision of additional off-chip attenuation to attain the control range required for transmitter-independent receiver testing. Moreover, each transmitter's output drive level must be measured by the ATE to enable the ATE to programmatically attenuate the transmitters' output drive levels for transmitter-independent receiver testing. As previously explained, any I-O pin which is connected to specialized loopback test circuitry for at-speed testing cannot be simultaneously connected to ATE for DC or low speed testing such as transmitter output drive level adjustment.

This invention provides a high-bandwidth, fixed attenuation loopback path facilitating at-speed BIST of integrated circuit devices incorporating hundreds of high speed I-O components while providing DC test access to the ATE for continuity, DC levels measurement and low speed functional testing.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
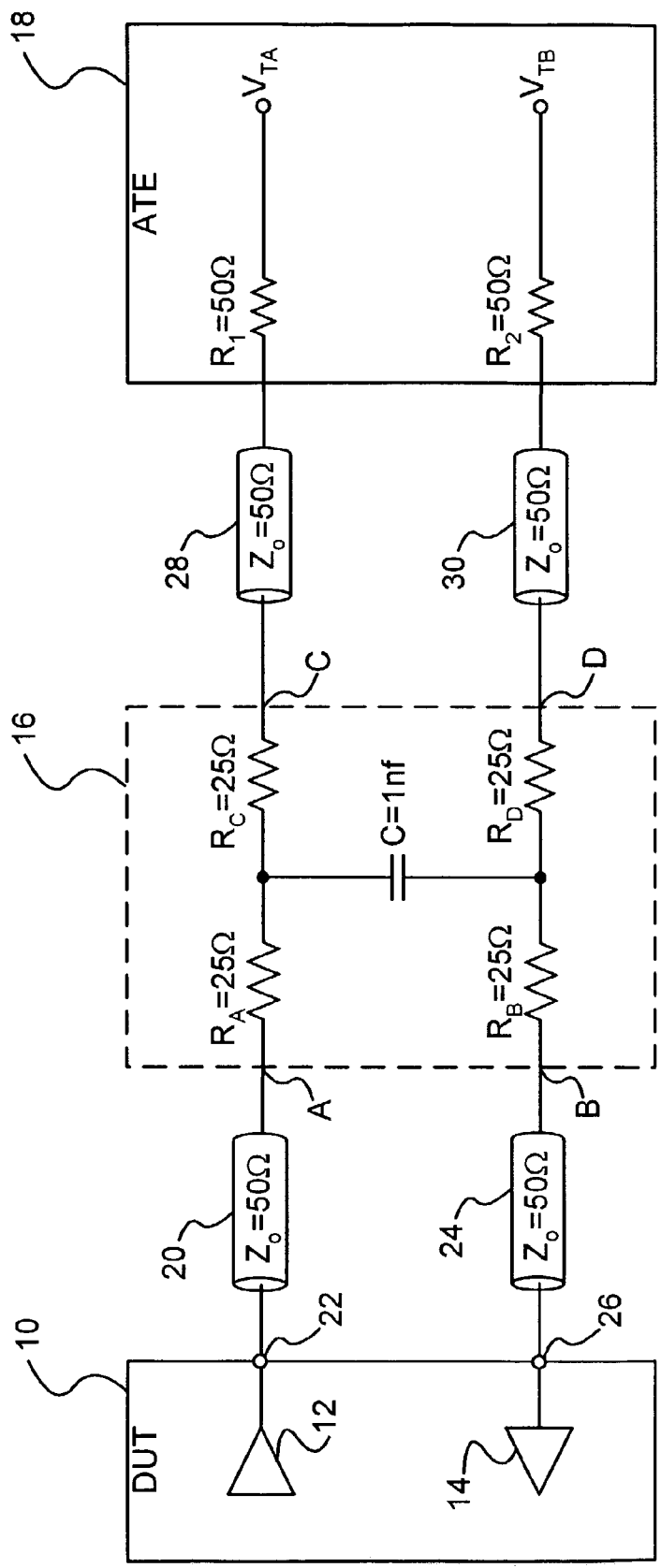
FIG. 1 schematically depicts a loopback circuit in accordance with the invention, coupled to a device under test (DUT) and automated test equipment (ATE).

FIG. 1 schematically depicts an integrated circuit device 10 which is to be tested. Device 10 is conventionally referred to as the "device under test" or "DUT." FIG. 1 depicts one of DUT 10's high speed transmitters 12 and one of DUT 10's high speed receivers 14. As previously explained, DUT 10 may incorporate hundreds of similar high speed I-O components. A loopback circuit 16 in accordance with the invention is connected between transmitter 12, ATE 18 and receiver 14. More particularly, separate loopback circuits (not shown) similar to loopback circuit 16 are coupled between ATE 18 and each DUT transmitter-receiver pair to be tested.

Loopback circuit 16 incorporates a 4-port power splitter and a DC-isolator. Specifically, resistors $R_A$, $R_B$, $R_C$ and $R_D$ form a power-splitting network having four ports A, B, C and D. If $R_A=R_B=R_C=R_D$, all power transmitted through port A is split into three equal portions which are transmitted to ports B, C and D respectively. $R_A$, $R_B$, $R_C$ and $R_D$ are positioned sufficiently close to one another and are made sufficiently small that they can be considered to be "lumped" at all frequencies of interest, meaning that transmission-line effects at and between ports A, B, C and D are negligible at such frequencies.

Printed circuit board trace (i.e. conductor) 20 electrically connects port A to DUT 10's pin 22, which is in turn electrically coupled to transmitter 12's output port. Printed circuit board trace 24 connects port B to DUT 10's pin 26, which is electrically coupled to receiver 14's input port. Printed circuit board trace 28 connects port C to ATE 18's $V_{TA}$ test port. Printed circuit board trace 30 connects port D to ATE 18's $V_{TB}$ test port. Each one of printed circuit board traces 20, 24, 28, 30 is equivalent to a transmission line having a characteristic impedance $Z_o=50\Omega$. ATE 18's pin electronics (schematically represented by resistors $R_1$, $R_2$) are accordingly programmed, in conventional fashion, to present passive 50Ω impedance-matching terminations at each of ports C and D, as illustrated in FIG. 1. Capacitor C provides DC isolation between the first resistor network branch formed by $R_A$, $R_C$ and the second resistor network branch formed by $R_B$, $R_D$ thereby DC-isolating DUT pins 22, 26 from one another.

Loopback circuit 16 is impedance-matched to the printed circuit board traces which electrically connect loopback circuit 16 to DUT 10. The printed circuit board trace impedances are normally matched to DUT 10's input impedance, which is usually 50Ω but may be 75Ω or 100Ω. Since the printed circuit board trace impedances are known, loopback circuit 16 can be designed to have a zero reflection coefficient at each of ports A, B, C, D (implying that $R_A=R_B=R_C=R_D$). In general, each of loopback circuit 16's resistors has a resistance value $$R = \left(\frac{n-2}{n}\right)Z_0$$

where n is the number of ports in the power-splitting network. The resultant gain (attenuation) is $$A = \frac{1}{n-1}.$$

Accordingly, to achieve zero reflection coefficient at all four of loopback circuit 16's n=4 ports A, B, C and D, requires resistor values of $R_A=R_B=R_C=R_D=Z_o/2=25\Omega$. The value of capacitor C is chosen to present negligible impedance at-speed test frequencies and to discharge quickly within the low frequency (e.g. JTAG testing) operating period. For example, a capacitance value C=1 nf is suitable.

At lower frequencies, capacitor C is equivalent to an open circuit, thereby providing the aforementioned DC isolation of DUT pins 22, 26. ATE 18 can therefore measure transmitter 12's output drive levels; independently verify the presence and correct operation of the ESD diodes associated with both transmitter 12 and receiver 14; independently check for resistive defects in either transmitter 12 or receiver 14; and, sample a low speed data signal output by transmitter 12 while simultaneously driving another low speed data signal into receiver 14.

At higher (at-speed) frequencies, loopback circuit 16 splits the output signal produced by transmitter 12 into three equal portions. As previously explained, each portion is attenuated by $$\frac{1}{n-1} = \frac{1}{3}$$

assuming $R_A=R_B=R_C=R_D=Z_o/2$. Any signal originating at DUT pin 22 is therefore attenuated by one-third before arriving at DUT pin 26. One of the three one-third attenuated signal portions is applied to each of ports B, C and D respectively. More particularly, a one-third attenuated portion of transmitter 12's output signal is applied to receiver 14. If transmitter 12's output drive level is within acceptable limits (as determined above), the attenuated signal portion is sufficient to test receiver 14's sensitivity, notwithstanding possible excess resiliency in transmitter 12's output drive level. Where capabilities exist (i.e. if transmitter 12's operating parameters such as power supply voltage, bias currents, etc. are suitably adjustable), transmitter 12's output drive voltage can be varied within a limited range to produce the desired input signal at receiver 14. One-third attenuation as aforesaid also facilitates receiver stress testing (i.e. testing of receiver 14's capability to receive signals smaller than the minimum input signal specified by the manufacturer) because typical DUT transmitter output drive levels are three to four times greater than typical DUT receiver sensitivities.

During at-speed testing, ATE 18's pin electronics (resistors $R_1$, $R_2$) are programmatically configured as aforesaid to present passive 50Ω impedance-matching terminations at each of ports C and D. Resistor $R_1$ thus absorbs the one-third attenuated signal portion which loopback circuit 16 transmits from port A to port C. Resistor $R_2$ similarly absorbs the one-third attenuated signal portion which loopback circuit 16 transmits from port A to port D.

Because loopback circuit 16 is symmetrical and preserves high signal quality at all of its ports, it provides a limited capability to perform non-BIST at-speed tests. This is desirable if DUT 10's loopback BIST circuitry is determined to be defective. For example, ATE 18 can be used to drive a high speed data test pattern signal into receiver 14, with some other interface being checked to determine test success or failure. Note that if ATE 18's $V_{TB}$ test port applies a high speed data signal to receiver 14 through printed circuit board trace 30, then loopback circuit 16 and pin 26, then transmitter 12 must be configured to output a data-free DC voltage signal in order to avoid interference with the drive signal applied to receiver 14. As another example, transmitter 12 can be configured to output a high speed data test pattern signal, with ATE 18 being used to observe transmitter 12's output in order to determine test success or failure. Although such limited capability non-BIST at-speed tests would normally be used only as a contingency measure, they represent a potential saving of time and money.

As will be apparent to those skilled in the art in the light of the foregoing disclosure, many alterations and modifications are possible in the practice of this invention without departing from the spirit or scope thereof. For example, the DC isolator need not be a capacitor; any DC-blocking device having good electrical conductivity at high frequencies can be used.

Figure 2:
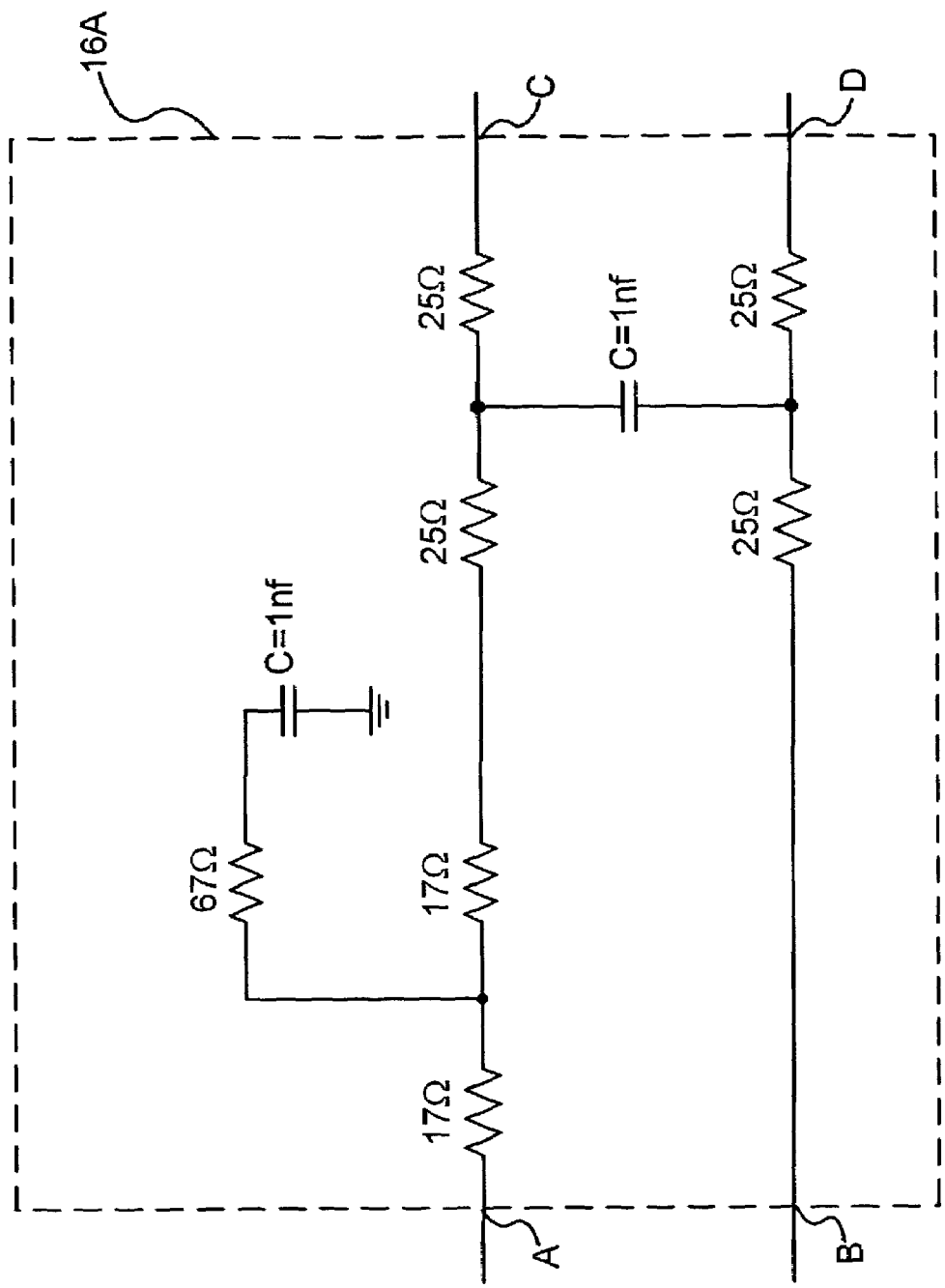
FIG. 2 schematically depicts a loopback circuit incorporating two cascaded power splitters, in accordance with the invention.

Multiple power splitters can be cascaded to produce a desired attenuation value. This is illustrated in FIG. 2, which depicts an alternative loopback circuit 16A incorporating two power splitters, one having 25Ω resistor values as above and the second having 17Ω and 67Ω resistor values. Loopback circuit 16A splits the signal applied at port A into three equal portions, each of which is attenuated by one-sixth.

Figure 3:
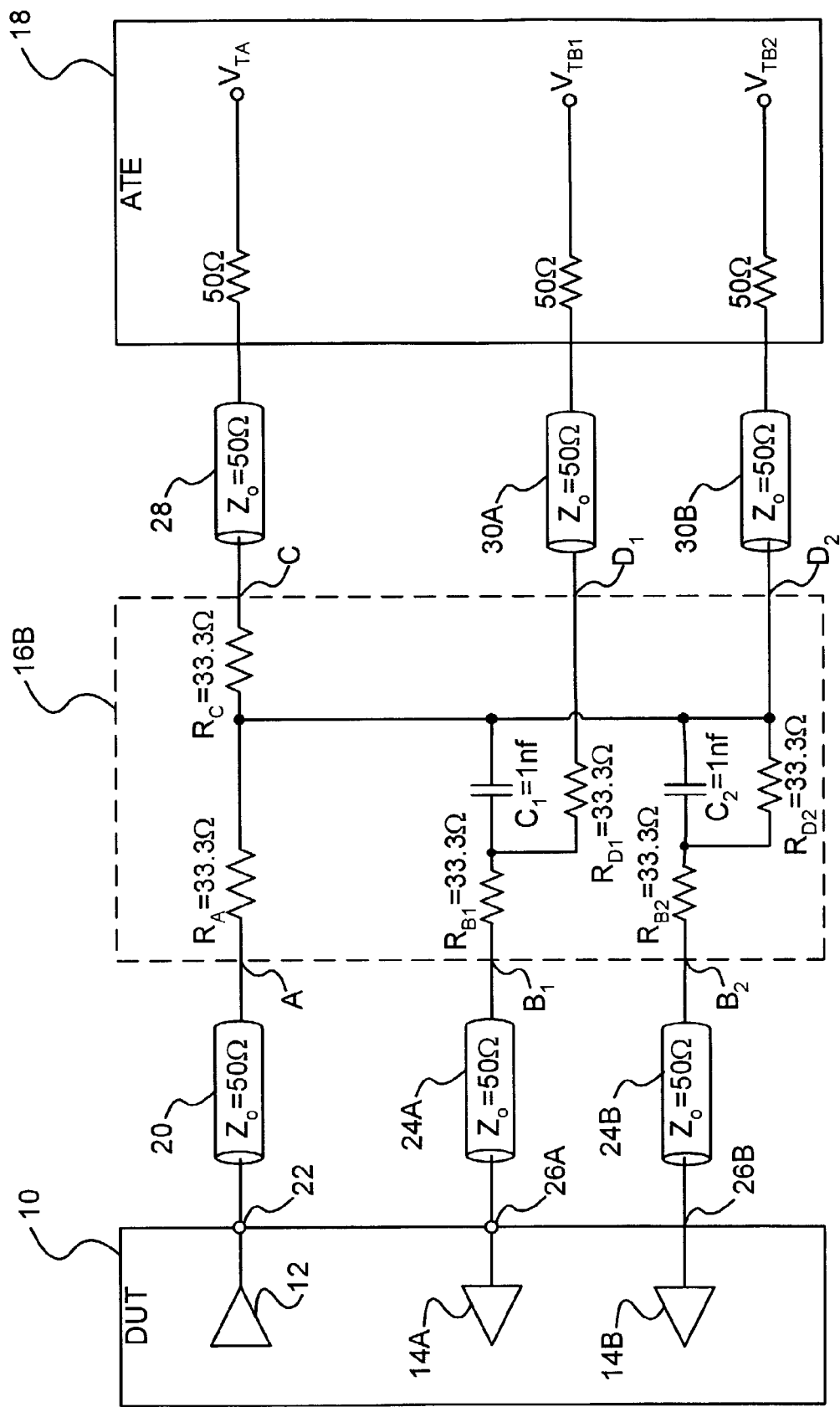
FIG. 3 schematically depicts a multiple-branch loopback circuit in accordance with the invention, coupled to a DUT and ATE.

Loopback circuits according to the invention can be configured with more than two branches to facilitate signal fan-out to multiple DUT pins. This is illustrated in FIG. 3, which depicts an alternative 6-port loopback circuit 16B configured to apply through ports $B_1$, $B_2$ on traces 24A, 24B to DUT pins 26A, 26B and thence to each of two receivers 14A, 14B respectively a one-fifth attenuated portion of transmitter 12's output signal. This is accomplished by substituting for loopback circuit 16's single branch incorporating resistor RB, two branches respectively incorporating resistors $R_{B1}$, $R_{B2}$; and, by substituting for loopback circuit 16's single branch incorporating resistor $R_D$, two branches respectively incorporating resistors $R_{D1}$, $R_{D2}$. Capacitors $C_1$, $C_2$ are selected as previously explained to be as small as possible, while having negligible impact on at-speed operation of loopback circuit 16B (i.e. $C_1=C_2=1$ nf). The $R_{D1}$ branch is connected through port $D_1$ and printed circuit board trace 30A to ATE 18's $V_{TB1}$ test port; the $RD_2$ branch is connected to through port $D_2$ and printed circuit board trace 30A to ATE 18's $V_{TB2}$ test port. The FIG. 3 embodiment can also be used to fan out data from a bit error rate test (BERT) device (not shown) to a multi-port DUT, or from a single "golden" device to a plurality of DUTs in a multi-device test fixture.

Figure 4:
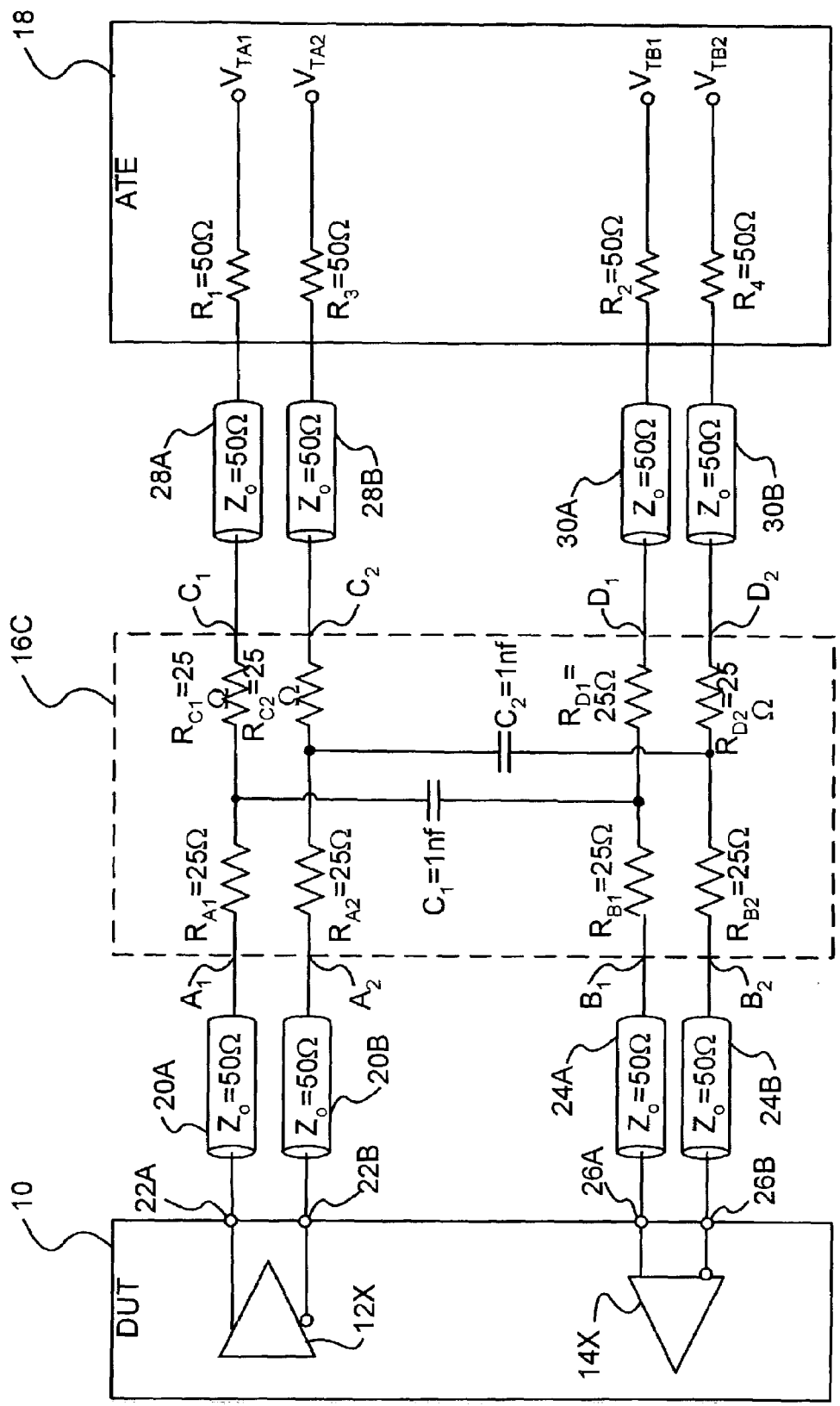
FIG. 4 schematically depicts a loopback circuit adapted in accordance with the invention to test a differential transmitter-receiver.

As yet another example, the invention can be adapted to test a transmitter-receiver differential pair. This is illustrated in FIG. 4, which depicts an alternative dual 4-port loopback circuit 16C for a DUT having a differentially-coupled transmitter 12X and receiver 14X. Loopback circuit 16C incorporates two 4-port power splitters, each having a DC-isolator. Specifically, resistors $R_{A1}$, $R_{B1}$, $R_{C1}$, and $R_{D1}$ form a first power-splitting network having four ports $A_1$, $B_1$, $C_1$ and $D_1$. Capacitor $C_1$ DC-isolates the resistor network branch formed by $R_{A1}$, $R_{C1}$, from the resistor network branch formed by $R_{B1}$, $R_{D1}$ thereby DC-isolating DUT pins 22A, 26A from one another. Resistors $R_{A2}$, $R_{B2}$, $R_{C2}$ and $R_{D2}$ form a second power-splitting network having four ports $A_2$, $B_2$, $C_2$ and $D_2$. Capacitor $C_2$ DC-isolates the resistor network branch formed by $R_{A2}$, $R_{C2}$ from the resistor network branch formed by $R_{B2}$, $R_{D2}$ thereby DC-isolating DUT pins 22B, 26B from one another. As previously explained, if $R_{A1}=R_{B1}=R_{C1}=R_{D1}$, all power transmitted through port $A_1$ is split by the first network into three equal portions which are transmitted to ports $B_1$, $C_1$, and $D_1$ respectively. Similarly, if $R_{A2}=R_{B2}=R_{C2}=R_{D2}$, all power transmitted through port $A_2$ is split by the second network into three equal portions which are transmitted to ports $B_2$, $C_2$ and $D_2$ respectively.

One of transmitter 12X's two differential outputs is connected through DUT pin 22A and printed circuit board trace 20A to loopback circuit 16C's port $A_1$. Transmitter 12X's other differential output is connected through DUT pin 22B and printed circuit board trace 20B to loopback circuit 16C's port $A_2$. One of receiver 14X's two differential inputs is connected through DUT pin 26A and printed circuit board trace 24A to loopback circuit 16C's port $B_1$. Receiver 14X's other differential input is connected through DUT pin 26B and printed circuit board trace 24B to loopback circuit 16C's port $B_2$. Printed circuit board traces 28A, 28B, 30A and 30B respectively connect loopback circuit 16C's ports $C_1$, $C_2$, $D_1$ and $D_2$ to ATE 18's $V_{TA1}$, $V_{TA2}$, $V_{TB1}$ and $V_{TB2}$ test ports.

Figure 5A:
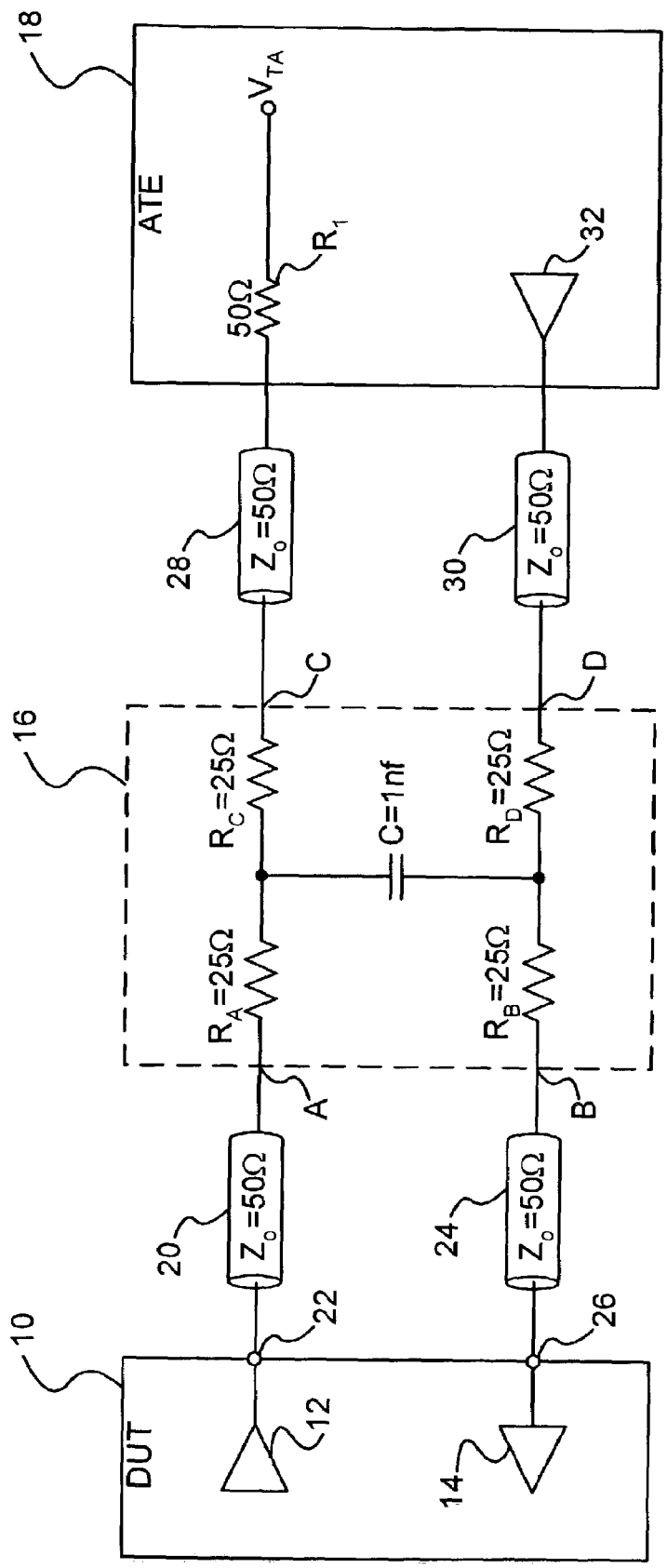
FIGS. 5A and 5B are similar to FIG. 1 and depict use of the invention to inject noise onto test signals.
Figure 5B:
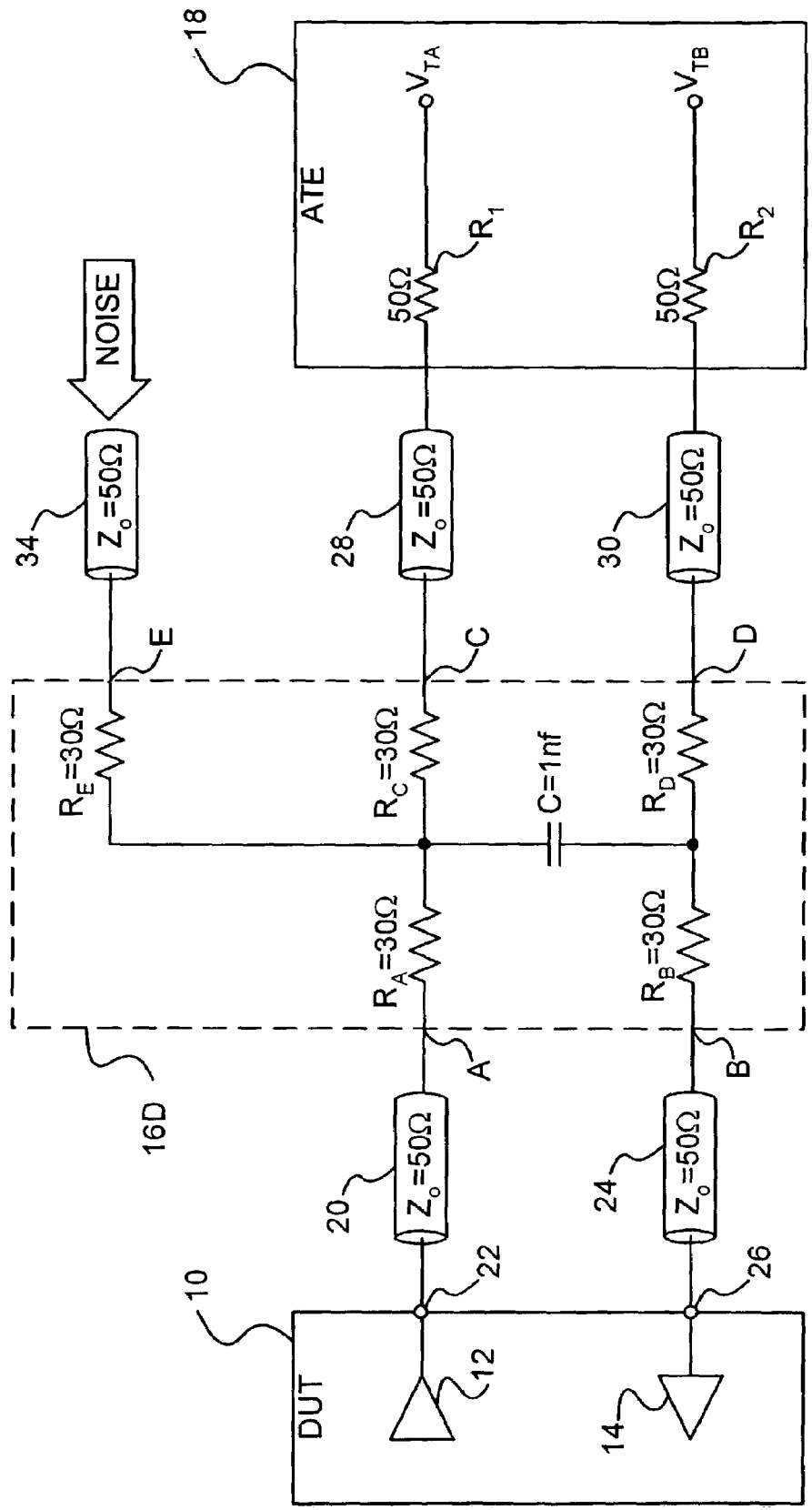

As a further example, the invention can used to superimpose noise on test signals, or to decrease signal-to-noise ratio during receiver testing. This is illustrated in FIGS. 5A and 5B. FIG. 5A is similar to FIG. 1, except that one of ATE 18's test drivers 32 is substituted for ATE 18's $V_{TB}$ test port and for the pin electronics represented in FIG. 1 by resistor $R_2$. Driver 32 can be actuated, in well known fashion, to inject a noise signal through loopback circuit 16. The noise signal is superimposed on the one-third attenuated portion of transmitter 12's output signal applied to receiver 14. Alternatively, as shown in FIG. 5B, an alternative 5-port loopback circuit 16D may include a fifth branch consisting of resistor $R_E$ through which a noise signal supplied by an external noise source can be injected (through printed circuit board trace 34 and port E) for superposition on the attenuated portion of transmitter 12's output signal applied to receiver 14. FIG. 5B is otherwise similar to FIG. 1.

In some cases it is desirable to perform at-speed tests on DUT 10 without any DC connection to ATE 18. But, if ATE 18 is programmed so that it does not terminate (i.e. presents high impedance to) the FIG. 1 loopback circuit 16, unwanted signal reflections are caused at the ends of printed circuit board traces 28, 30 coupled to ATE 18. This is avoided by the FIG. 6 embodiment, which depicts an alternative loopback circuit 16E configured with inductors $L_C$, $L_D$ replacing resistors $R_C$, $R_D$ respectively of the FIG. 1 loopback circuit 16. Inductors $L_C$, $L_D$ remove voltage transients which would otherwise be reflected by ATE 18 and disrupt the operation of differential receiver 14C. Since signal reflections from ATE 18 are no longer problematic, ATE 18's pin electronics need not be programmed to provide impedance-matched terminations at each of ports C and D.

Figure 6:
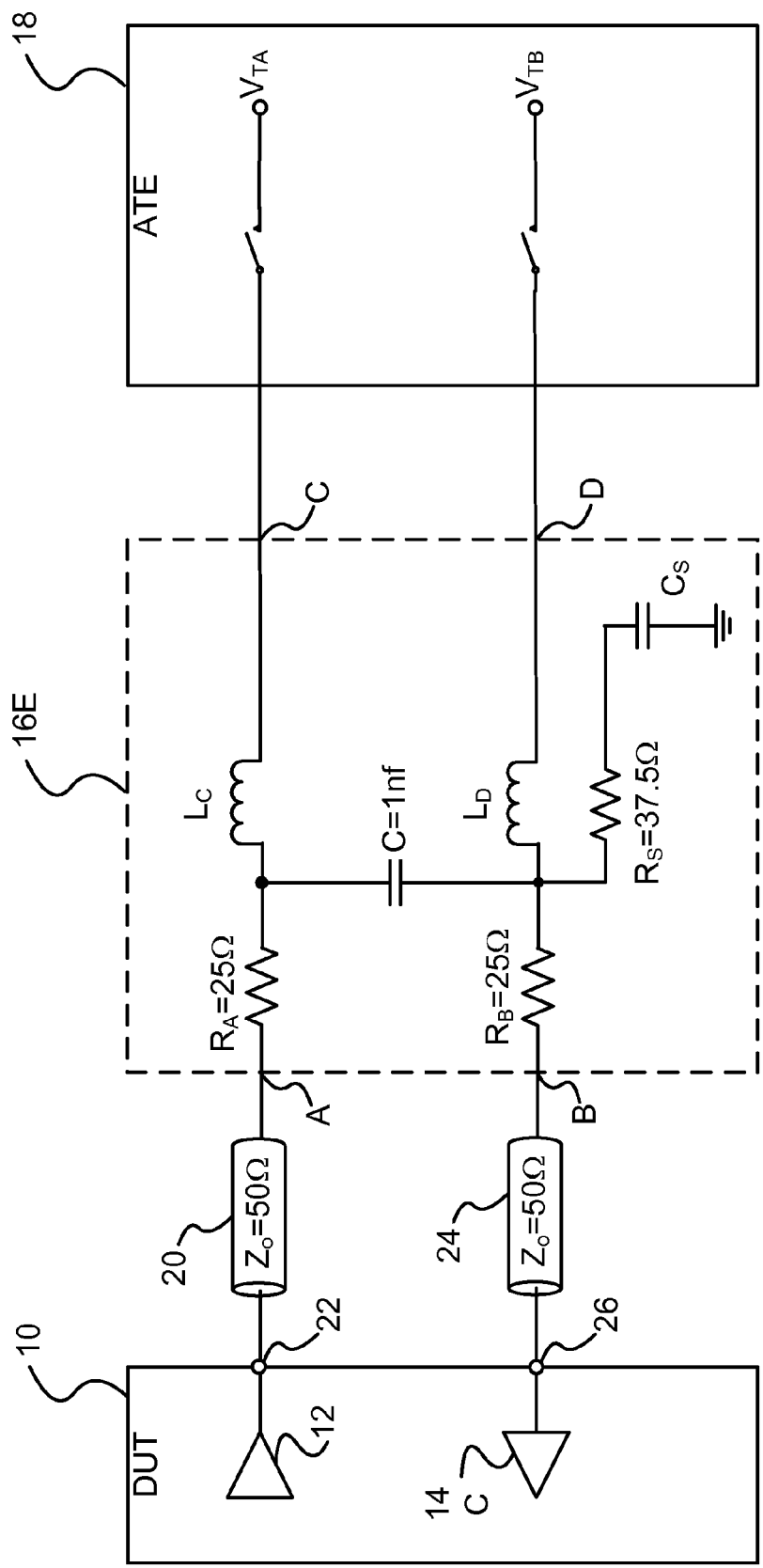
FIG. 6 schematically depicts a loopback circuit adapted in accordance with the invention for at-speed testing of a DUT without DC connection to ATE.

Removal of resistors $R_C$, $R_D$ (see FIG. 1) eliminates the previously explained attenuation capability of the FIG. 6 loopback circuit 16E. That capability is restored by series-connecting a resistor-capacitor network formed by resistor $R_S$ (having a resistance value of $$\frac{25+50}{2} = 37.5\Omega)$$

and capacitor $C_S$ between $R_B$, $L_D$ and ground. Capacitor $C_S$ provides AC coupling to ground. As previously explained, capacitor C's capacitance value is selected to be as small as possible, while having negligible impact on at-speed operation of loopback circuit 16E (i.e. C=1 nf). The inductance values of $L_C$ and $L_D$ are also selected to be as small as possible, while having negligible impact on at-speed operation of loopback circuit 16E (i.e. $L_C$=$L_D$=100 nH). Once suitable values of $R_A$, $R_B$, C, $L_C$, $L_D$ are selected to attain the desired at-speed operation, loopback circuit 16E's transient settling time can be estimated. JTAG boundary scan test capability can then be verified to ensure that loopback circuit 16E operates correctly at the relatively low 5 MHz frequency typical to JTAG boundary scan testing.

Any embodiment of the invention can be adapted by adding resistor $R_S$ and capacitor $C_S$ as shown in FIG. 6 and by appropriately selecting the resistance values of $R_A$, $R_B$, and $R_S$ to adjust the loopback circuit's attenuation A. Specifically, since $$R_A = R_B = \left(\frac{n-2}{n}\right)Z_0$$

and since $$A = \frac{1}{n-1},$$

it follows that $$R_A = R_B = \left(\frac{1-A}{1+A}\right)Z_0.$$

Furthermore, since $$R_S = \left(\frac{2}{n}\right)\left(\frac{n-1}{n-2}\right)Z_0,$$

it follows that $$R_S = \left(\frac{2A}{1-A^2}\right)Z_0.$$

Accordingly, $R_A$, $R_B$, and $R_S$ can be selected to yield any desired attenuation value A between 0 and 1, including non-integer attenuation values. For example, the FIG. 3 loopback circuit 16B can be adapted by series-connecting separate $R_S C_S$ resistor-capacitor networks to each of the $R_{B1} R_{D1}$ and $R_{B2} R_{D2}$ resistor networks to facilitate attenuation adjustment while maintaining signal quality and fan-out capability.

What is claimed is:

1. A loopback circuit for testing both low and high frequency operation of integrated circuit transmitter and receiver components, said loopback circuit comprising:
   (a) a first branch having first and second resistors connected in series between first and second ports of said circuit;
   (b) a second branch having third and fourth resistors connected in series between third and fourth ports of said circuit; and,
   (c) a DC isolator connected between said first and second branches;
   wherein said first, second, third, and fourth resistors have resistance values selected to match the impedance of said loopback circuit to the characteristic impedance of conductors electrically connected between said loopback circuit and said integrated circuit transmitter and receiver components.

2. A loopback circuit as defined in claim 1, wherein said first, second, third, and fourth resistors have equal resistance values.

3. A loopback circuit as defined in claim 1, wherein said first, second, third, and fourth resistor resistance values are further selected to apply through one of said second branch ports a selectably attenuated portion of a signal produced at an output of said transmitter and applied to one of said first branch ports.

4. A loopback circuit as defined in claim 1, wherein said first, second, third, and fourth resistor resistance values are further selected to apply through one of said second branch ports a one-third attenuated portion of a signal produced at an output of said transmitter and applied to one of said first branch ports.

5. A loopback circuit as defined in claim 3, wherein said first, second, third, and fourth resistors have equal resistance values.

6. A loopback circuit for testing both low and high frequency operation of integrated circuit transmitter and receiver components, said loopback circuit comprising:
   (a) a first branch having first and second resistors connected in series between first and second ports of said circuit;
   (b) a second branch having third and fourth resistors connected in series between third and fourth ports of said circuit;
   (c) a DC isolator connected between said first and second branches;
   wherein:
   (d) said first and second resistors have resistance values selected to match the impedance of said first branch to the characteristic impedance of conductors electrically connected between said integrated circuit transmitter and said first branch; and,
   (e) said third and fourth resistors have resistance values selected to match the impedance of said second branch to the characteristic impedance of conductors electrically connected between said integrated circuit receiver and said second branch.

7. A loopback circuit for testing both low and high frequency operation of integrated circuit transmitter and receiver components, said loopback circuit comprising:

(a) a first branch having first and second resistors connected in series between first and second ports of said circuit;

(b) a second branch having third and fourth resistors connected in series between third and fourth ports of said circuit;

(c) a DC isolator connected between said first and second branches;

wherein:

(d) said first and second resistors have resistance values selected to match the impedance of said first branch to the characteristic impedance of conductors electrically connected between said integrated circuit transmitter, said first branch and automated test equipment; and, (e) said third and fourth resistors have resistance values selected to match the impedance of said second branch to the characteristic impedance of conductors electrically connected between said integrated circuit receiver, said second branch and said automated test equipment.

8. A first loopback circuit for testing both low and high frequency operation of integrated circuit transmitter and receiver components, said first loopback circuit comprising:

(a) a first branch having first and second resistors connected in series between first and second ports of said first loopback circuit;

(b) a second branch having third and fourth resistors connected in series between third and fourth ports of said first loopback circuit;

(c) a first DC isolator connected between said first and second branches;

said first loopback circuit series-connected to a second loopback circuit for testing both low and high frequency operation of integrated circuit transmitter and receiver components said second loopback circuit comprising:

(d) a third branch having fifth and sixth resistors connected in series between fifth and sixth ports of said second loopback circuit;

(e) a fourth branch having seventh and eighth resistors connected in series between seventh and eighth ports of said second loopback circuit;

(f) a second DC isolator connected between said third and fourth branches;

wherein:

(g) said first second third and fourth resistors have resistance values selected to apply through one of said first loopback circuit second branch ports a selectably attenuated portion of a signal applied to one of said first loopback circuit first branch ports; and, (h) said fifth sixth seventh and eighth resistors have resistance values selected to apply through one of said second loopback circuit fourth branch ports a selectably attenuated portion of a signal applied to one of said second loopback circuit third branch ports.

9. A loopback circuit for testing both low and high frequency operation of integrated circuit transmitter and receiver components said loopback circuit comprising:

(a) a first branch having first and second resistors connected in series between first and second ports of said circuit;

(b) a second branch having third and fourth resistors connected in series between third and fourth ports of said circuit;

(c) a DC isolator connected between said first and second branches;

(d) a third branch having fifth and sixth resistors connected in series between fifth and sixth ports of said circuit; and, (e) a second DC isolator connected between said first and third branches.

10. A loopback circuit as defined in claim 9, wherein said DC isolators are capacitors.

11. A loopback circuit as defined in claim 9, wherein said first, second, third, fourth, fifth and sixth resistors have resistance values selected to match the impedance of said loopback circuit to the characteristic impedance of conductors electrically connected between said loopback circuit and said integrated circuit transmitter and receiver components.

12. A loopback circuit as defined in claim 9, wherein:

(a) said first and second resistors have resistance values selected to match the impedance of said first branch to the characteristic impedance of conductors electrically connected between said integrated circuit transmitter and said first branch;

(b) said third and fourth resistors have resistance values selected to match the impedance of said second branch to the characteristic impedance of conductors electrically connected between a first one of said integrated circuit receiver components and said second branch; and, (c) said fifth and sixth resistors have resistance values selected to match the impedance of said third branch to the characteristic impedance of conductors electrically connected between a second one of said integrated circuit receiver components and said third branch.

13. A loopback circuit as defined in claim 9, wherein:

(a) said first and second resistors have resistance values selected to match the impedance of said first branch to the characteristic impedance of conductors electrically connected between said integrated circuit transmitter, said first branch and automated test equipment;

(b) said third and fourth resistors have resistance values selected to match the impedance of said second branch to the characteristic impedance of conductors electrically connected between a first one of said integrated circuit receiver components, said second branch and said automated test equipment; and, (c) said fifth and sixth resistors have resistance values selected to match the impedance of said third branch to the characteristic impedance of conductors electrically connected between a second one of said integrated circuit receiver components, said third branch and said automated test equipment.

14. A loopback circuit as defined in claim 11, wherein said first, second, third, fourth, fifth and sixth resistors have equal resistance values.

15. A loopback circuit as defined in claim 11, wherein said first, second, third, fourth, fifth and sixth resistor resistance values are further selected to apply through one of said second branch ports a selectably attenuated portion of a signal produced at an output of said transmitter and applied to one of said first branch ports.

16. A loopback circuit as defined in claim 11, wherein said first, second, third, fourth, fifth and sixth resistor resistance values are further selected to apply through one of said second branch ports and through one of said third branch ports one-fifth attenuated portions of a signal produced at an output of said transmitter and applied to one of said first branch ports.

17. A loopback circuit for testing both low and high frequency operation of integrated circuit transmitter and receiver components said loopback circuit comprising:

(a) a first branch having first and second resistors connected in series between first and second ports of said circuit;
(b) a second branch having third and fourth resistors connected in series between third and fourth ports of said circuit;
(c) a DC isolator connected between said first and second branches; and
(d) a third branch having a fifth resistor connected in series between one of said first or second branches and a fifth port of said circuit, said fifth port for coupling to a noise signal source.

18. A loopback circuit for testing both low and high frequency operation of integrated circuit transmitter and receiver components, said loopback circuit comprising:
    (a) a first branch having a first resistor and a first inductor connected in series between first and second ports of said circuit;
    (b) a second branch having a second resistor and a second inductor connected in series between third and fourth ports of said circuit; and,
    (c) a DC isolator connected between said first and second branches.

19. A loopback circuit as defined in claim 18, further comprising a third resistor and a capacitor series-connected between said second resistor and said second inductor and an electrical ground potential.

20. A method of testing both low and high frequency operation of integrated circuit transmitter and receiver components, comprising:
    (a) connecting an output of said transmitter through a first resistor network to automated test equipment;
    (b) connecting said automated test equipment to an input of said receiver through a second resistor network;
    (c) during said low frequency testing, DC-isolating said first resistor network from said second resistor network;
    (d) during said high frequency testing, connecting said first resistor network to said second resistor network to apply to said input of said receiver a portion of a signal produced at said output of said transmitter, said portion attenuated by passage through said first and second resistor networks.

21. A method as defined in claim 20, further comprising producing said attenuated portion by selecting resistance values of resistors forming said first and said second resistor networks.

22. A method as defined in claim 20, further comprising impedance-matching said first resistor network to the characteristic impedance of conductors electrically connected between said first resistor network and said transmitter, and impedance-matching said second resistor network to the characteristic impedance of conductors electrically connected between said second resistor network and said receiver.

23. A method as defined in claim 20, further comprising selecting said first and said second resistor network values to match the characteristic impedance of conductors electrically connected between said first and said second resistor networks and said integrated circuit transmitter and receiver components.

24. A method as defined in claim 20, further comprising impedance-matching said first resistor network and said second resistor network to the characteristic impedance of conductors electrically connected between said first resistor network, said second resistor network and said automated test equipment.

25. A method as defined in claim 20, further comprising, during said high frequency testing selectably setting a termination voltage produced by said automated test equipment.

26. A method as defined in claim 20, further comprising producing said attenuated portion by series-connecting a resistor-capacitor network between said second resistor network and an electrical ground potential, and selecting resistance values of resistors forming said first and said second resistor networks and said resistor-capacitor network.

* * * * *